Figures 1, 2:
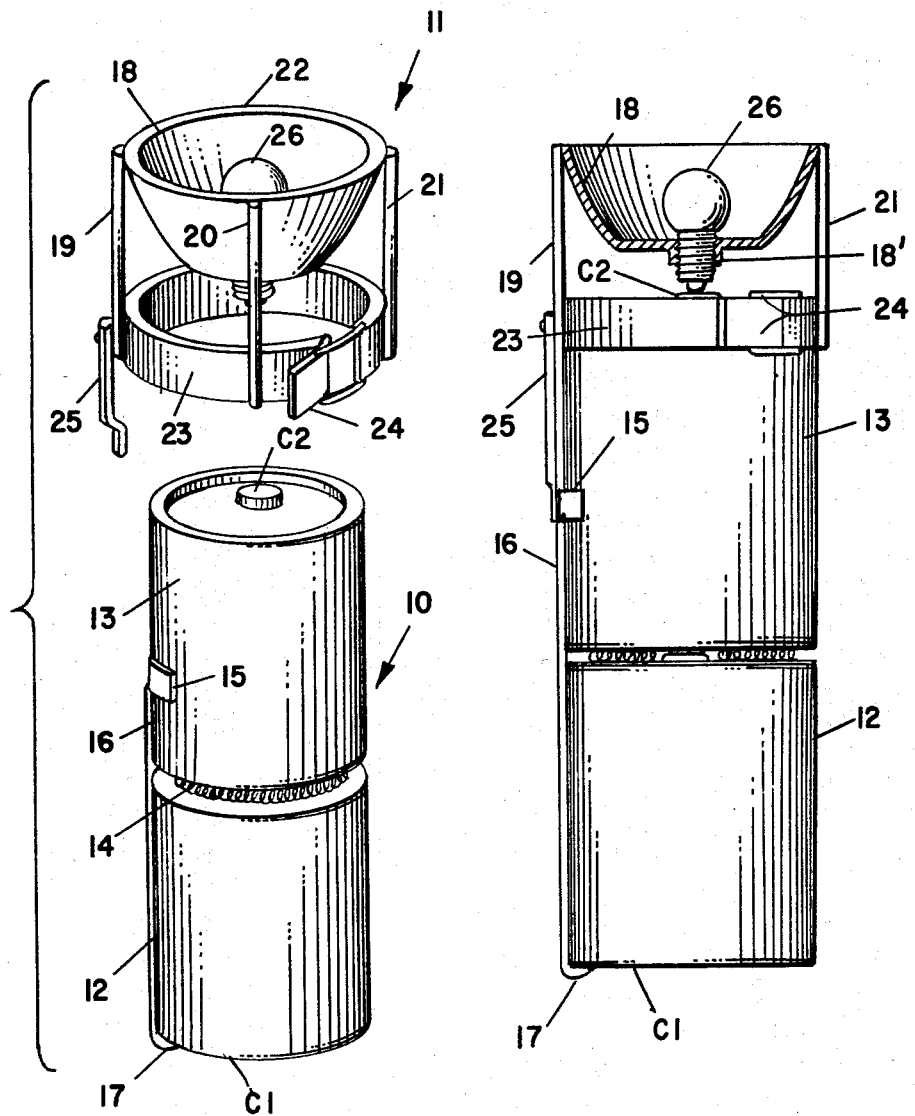

Nov. 1, 1966  G. J. HOESL  3,283,137

FLASHLIGHT

Filed Aug. 7, 1964

INVENTOR.
GERALD J. HOESL
BY Elliott & Pastoriza
ATTORNEYS

3,283,137
FLASHLIGHT
Gerald J. Hoesl, 221½ Ash St., Oxnard, Calif.
Filed Aug. 7, 1964, Ser. No. 388,064
2 Claims. (Cl. 240—10.61)

This invention relates to flashlights and more particularly, to a novel flashlight construction for effecting considerable economy in the manufacture of flashlights.

Conventional flashlights usually incorporate an elongated casing for supporting the batteries together with threaded elements and cap members for supporting a first contact at the base of the batteries and a suitable reflector assembly. In addition, a switch is built into the casing structure for the flashlight for turning the light on and off. Thus, there are necessary a number of components to make up the flashlight as well as considerable material to house the various components and effect the desired electrical connections to provide a workable unit.

With the foregoing in mind, it is a primary object of this invention to provide a novel flashlight construction in which a minimum number of parts are employed with a consequent savings in cost to the end that a more economical flashlight which functions as well as known flashlights is provided.

More particularly, it is an object to provide an improved flashlight in which a casing is wholly avoided, the batteries themselves functioning as a handle in cooperation with a reflector assembly which may be detached from the batteries when the same are used up.

Briefly, these and many other objects and advantages of this invention are attained by providing a battery assembly which may comprise conventional type cylindrical batteries in coaxial alignment secured together to form a rigid structure. This rigid structure serves as a handle. A suitable conducting plate is secured to the side of the assembly and a single wire extending from the plate connects to the base contact of the battery assembly.

Cooperating with the foregoing, is a reflector assembly which comprises a reflector receiving a light bulb and a suitable frame structure for connecting to the reflector an annular securing band arranged to surround and clamp the upper end of the battery assembly. The reflector assembly, in turn, may include a single elongated flexible strip arranged to make contact upon sliding of the same with the conducting plate on the battery assembly so that a circuit is completed to the bulb through the conducting plate and reflector assembly, the normal tip of the bulb engaging the top terminal of the battery assembly.

The foregoing arrangement is such that when the batteries have been used up, the annular band supporting the reflector assembly may readily be removed and the battery units disposed of. The band may then be clamped around new batteries, these new batteries then serving as the handle for the flashlight.

A better understanding of the invention will be had by now referring to a preferred embodiment thereof as illustrated in the accompanying drawings, in which:

FIGURE 1 is an exploded view illustrating the battery assembly and reflector assembly making up the basic components of the improved flashlight of this invention; and, FIGURE 2 is an elevational view partly in cross-section illustrating the components of FIGURE 1 in assembled condition.

Referring first to FIGURE 1, the improved flashlight comprises a battery assembly designated generally by the numeral 10 and a reflector assembly designated generally by the numeral 11. The battery assembly 10 may include a single elongated battery means or alternatively, two conventional type batteries secured in coaxial alignment, such as indicated at 12 and 13. For securing the batteries, welding, soldering or glue, such as indicated at 14, may be used. The batteries in assembled condition define a cylindrical shape which constitutes a handle for the flashlight.

As shown, a conducting plate 15 is secured to the side of the battery assembly and there is provided a single wire 16 extending from the plate 15 to a lower contact C1 of the battery assembly to which it is secured as at 17.

The reflector assembly 11 includes a metal reflector 18 and a plurality of rods 19, 20, 21, and 22 for supporting an annular clamping band 23 below the reflector as shown. The band 23 may be provided with an overcenter snap type clamping structure 24 so that the band may be radially contracted when secured to a cylindrical object.

The foregoing reflector assembly is completed by a flexible strip 25 riveted to the assembly such as the rod 19, and having a free end extending downwardly below the annular band 23. A light bulb 26 is arranged to be threaded into the center of the reflector member 18 as illustrated.

Referring now to the assembled view of FIGURE 2, it will be noted that when the annular band 23 is clamped about the upper end of the battery assembly as by the overcenter clamp structure 24, the bulb 26 will be disposed so that its lower tip engages the second contact C2 of the battery means. Further, the flexible strip 25 will be disposed in a position adjacent to the conducting plate 15. Thus, when the flexible strip 25 is slid as by a person's thumb into contact with the plate 15, a circuit is completed from the contact C1 at the lower end of the battery assembly through the wire 16, plate 15, flexible strip 25, and reflector assembly rod 19 through the reflector 18 and the threaded socket 18' and the bulb filament to the other terminal of the bulb 26. There is thus provided a flashlight structure which will function in the manner of a conventional flashlight but without the necessity of any casing.

In operation, the battery assembly 10 illustrated in FIGURE 1 may be purchased in the assembled form as shown, or a single elongated battery structure may be provided with a suitable plate such as indicated at 15 and the wire connection 16 to the first contact C1 incorporated in the structure. The cost for the battery assembly thus would not be appreciably greater than that for the batteries themselves.

The reflector assembly may also be purchased as a separate unit and reused with each set of new batteries.

When the batteries are purchased, the user will simply unsnap the overcenter coupling 24 and secure the band 23 about the upper end of the battery assembly and then clamp the band about the batteries by operation of the overcenter clamp. The circumferential positioning of the band is adjusted so that the flexible strip 25 is juxtaposed the plate 15. A bulb which may be already positioned in the reflector or purchased and screwed into the reflector will then make contact with the upper contact C2 of the battery assembly. When the user slides the flexible strip 25 into the plate 15, a circuit is completed through the first contact C1 at the base of the battery assembly up through the plate and flexible strip and reflector assembly to the bulb threads and thence through the filament to C2.

When the batteries become worn out, the clamp 23 is simply removed and the battery, wire, and plate disposed of as a unit and a new battery assembly substituted.

From the foregoing description, it will thus be evident that the present invention has provided an improved flashlight which is considerably more economical than flashlights presently available in that the entire casing structure normally provided has been eliminated, the batteries themselves serving the dual function of supplying power and also as a handle for the flashlight.

In addition to the foregoing, the reflector assembly also serves the triple function of supporting the flexible strip to provide a switch contact, conductor, and also function as a reflector for the bulb.

While only one particular embodiment has been set forth and described for illustrative purposes, various changes that fall within the scope and spirit of this invention will occur to those skilled in the art. The flashlight is therefore not to be thought of as limited to the exact embodiment set forth merely for illustrative purposes.

What is claimed is:

1. A flashlight comprising; a battery assembly including: electrical battery means having a first and a second electrical contact; a conducting plate secured on a side portion of said battery means; an electrical wire connecting said plate to said first electrical contact; and a reflector assembly including: a reflector member threaded at its lower end to receive a light bulb; an annular band having clamping means for effecting radial contraction of said band; a plurality of rods securing said reflector member to said annular band; and a resilient strip riveted to said reflector assembly and having a free end extending beyond the plane of said band, whereby said band may be clamped to an end portion of said battery means in a position such that said free end of said strip is adjacent to said conducting plate and said lower end of said reflector member is juxtaposed said second contact so that threading of a light bulb therein effects contact between said light bulb and second contact and sliding of said resilient member into contact with said plate connects said first contact through said reflector assembly to said light bulb.

2. A flashlight according to claim 1, in which said battery assembly includes first and second cylindrical batteries secured together in coaxial alignment so that said first contact is defined at the bottom of said first battery and said second contact is defined at the top of said second battery, said battery assembly functioning as a handle for said flashlight.

References Cited by the Examiner

UNITED STATES PATENTS

| 1,021,093 | 3/1912 | Forshein | 240—10.61 |
| 2,340,101 | 1/1944 | Bailhe | 240—10.68 |
| 2,456,680 | 12/1948 | Croft | 240—10.61 |
| 2,513,071 | 6/1950 | Wendt | 240—10.61 |
| 2,826,681 | 3/1958 | Anthony et al. | 240—10.61 |

NORTON ANSHER, *Primary Examiner*.